Aug. 24, 1948.                    C. D. WEST                      2,447,828
                              LIGHT-POLARIZING PRISM
                              Filed Feb. 17, 1945

INVENTOR.
Cutler D. West
BY Donald L. Brown
Attorney

Patented Aug. 24, 1948

2,447,828

UNITED STATES PATENT OFFICE 2,447,828

LIGHT-POLARIZING PRISM

Cutler D. West, Cambridge, Mass., assignor to Polaroid Corporation, Cambridge, Mass., a corporation of Delaware Application February 17, 1945, Serial No. 578,463

3 Claims. (Cl. 88—65)

This invention relates to light-polarizing prisms, and more particularly to optically isotropic prisms wherein polarizing of transmitted light is accomplished by total reflection of the desired light component at a plane interface between said prism and a birefringent medium bonded thereto, and having its highest index of refraction substantially equal to the index of refraction of the prism.

Other objects of the invention are to provide a light-polarizing prism of the character described wherein an isosceles prism is employed, and more specifically a truncated right isosceles prism is employed with the birefringent coating on its hypotenusal face; to provide as a preferred birefringent coating a basal section of a uniaxial crystal, and more specifically a basal section of a sodium nitrate crystal; and to provide a light-absorbing coating on the outer surface of the crystal section whereby light incident on the entrance face of said prism in a direction substantially parallel to the hypotenusal face thereof will be refracted within the prism so as to be incident upon the interface between the hypotenuse of the prism and the birefringent layer at such angles that the component for which the prism and the birefringent layer have different indices of refraction is totally internally reflected and emerges from the exit face of the prism as a beam of polarized light.

Figure 1:
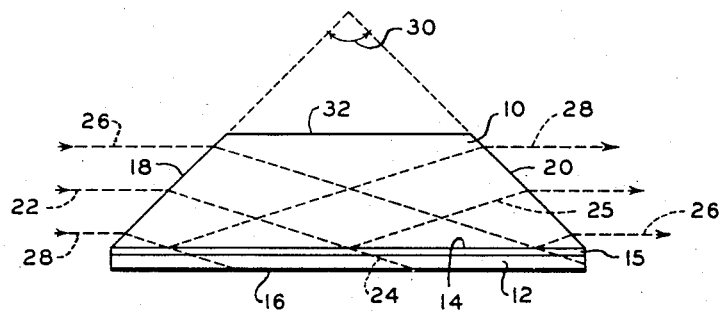
Figure 2:
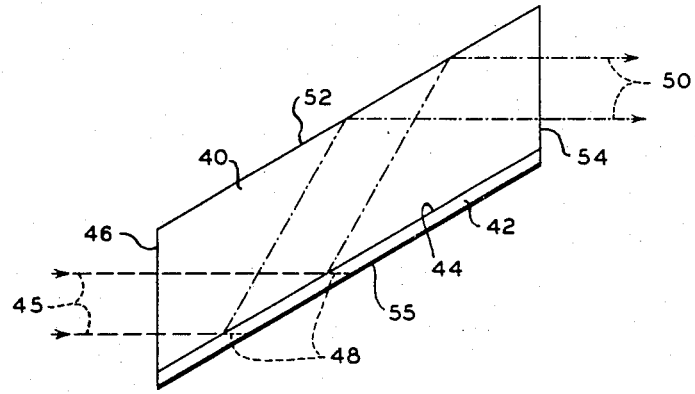

Additional objects and advantages will in part appear and in part be pointed out in the course of the following detailed description of several embodiments of the invention which are given as nonlimiting examples in connection with the accompanying drawings, in which:

Figure 1 is a diagrammatic view illustrating the operation of a polarizing prism embodying a form of the invention; and Figure 2 is a view similar to Fig. 1 illustrating the operation of another embodiment of the invention.

In Fig. 1 prism 10 may comprise glass or any other suitable transparent and optically isotropic material. Element 12 comprises a layer of birefringent material, preferably a basal section of a uniaxial crystal or analogous material, bonded to prism face 14 by a layer 15 of any suitable adhesive material. For preferred results, birefringent layer 12 will comprise material wherein the difference between the refractive indices is as great as possible, and the materials composing prism 10 and adhesive layer 15 are so chosen that their respective refractive indices match as closely as possible the higher refractive index of birefringent layer 12. The outer surface of layer 12 is preferably provided with a coating 16 comprising material adapted to absorb all light incident thereon and preferably also having a refractive index substantially matching the higher refractive index of layer 12, in accordance with the conventional practice with polarizing prisms.

An example of a suitable material for use in layer 12 is a basal section of sodium nitrate, whose refractive indices are, respectively, 1.336 and 1.587. In this case an adhesive having the desired refractive index may be readily formed by mixing in the proper proportions a plurality of adhesive materials whose refractive indices are respectively higher and lower than the higher index of sodium nitrate. For example, said adhesive layer may comprise a mixture of Canada balsam and a chlorinated polyphenyl such as that sold under the trade name "Aroclor 4465," mixed in such proportions as to fulfill the condition.

$$nV = n_1V_1 + n_2V_2$$

wherein $n$, $n_1$ and $n_2$ represent, respectively, the index to be matched and the indices of the components, and $V$, $V_1$ and $V_2$ represent the volumes of the mixture and of the two components, respectively.

In the embodiment of the invention shown in Fig. 1, prism 10 is shown as a truncated, right isosceles prism, with entrance face 18 and exit face 20 making equal angles with hypotenusal face 14. Dotted line 22 represents a light ray travelling outside the prism in a direction parallel to prism face 14 and incident at such a point on entrance face 18 that it is refracted to the mid-point of face 14. At the interface with birefringent layer 12 said ray is resolved into two components. The component for which the indices of prism 10 and birefringent layer 12 match will continue through layer 12, as indicated at 24, and will be absorbed by coating 16. However, the critical angle for the light component for which said indices do not match is in this example of the invention approximately 57°, i. e., substantially less than the angle of incidence of ray 22 on said interface. The extraordinary ray, therefore, is totally internally reflected, as indicated by dotted line 25, and emerges from exit face 20 in the same direction as that in which it was travelling before it entered the prism. Dotted lines 26 and 28 represent similar light rays travelling parallel to ray 22 but incident on entrance face 18 above and below ray 22, respectively. They are similarly resolved and reflected at the interface with birefringent layer 12, but on emerging from exit face 20 are shifted to directions parallel to their original course. In other words, any ray parallel to ray 22 but incident on entrance face 18 above or below ray 22 will emerge from exit face 20 as polarized light but will be shifted to the opposite side of ray 25 from its relative position with respect to ray 22 at entrance face 18. That is to say, any image carried by rays 22, 26 and 28 will emerge from exit face 20 as a polarized image either reversed from right to left or inverted from its original position, and if the prism is rotated about the rays 22, the image will rotate with twice the angular velocity of the prism.

It will also be seen that all other light incident on entrance face 18 and emerging from exit face 20 after reflection of the interface with birefringent layer 12 will be similarly polarized. In the case of rays incident on entrance face 18 at angles greater than the angle of incidence of ray 22, the extraordinary ray will be totally reflected and the limiting ray will be that incident on entrance face 18 at grazing. The case is slightly different for light incident on face 18 at angles less than the angle of incidence of ray 22. There will still be total internal reflection of the extraordinary ray for light whose angle of incidence is such that after refraction its angle of incidence at the interface with birefringent layer 12 is greater than the above-mentioned critical angle. In the particular example of the invention wherein the angle between prism faces 18 and 14 is 45° and layer 12 comprises sodium nitrate, the limiting angle of incidence on entrance face 18 for total internal reflection within the prism is approximately 25.1°. On the other hand, light incident on entrance face 18 at still smaller angles will suffer ordinary reflection at the interface with birefringent layer 12. Such of said light as emerges from exit face 20 will be completely polarized, and the remainder will be refracted into layer 12 and absorbed by coating 16. It will also be noted that all rays other than those parallel to ray 22 will be deviated from their original course after traversing prism 10.

It will accordingly be seen that the particular example of the invention shown and described in connection with Fig. 1 comprises a polarizing prism having an effective angular aperture of the order of 70°, and further that all light emerging from exit face 20 will be completely and uniformly polarized. This angular aperture depends in turn both upon the birefringence of the material composing layer 12 and also on angle 30 at the apex of the prism. It will be noted that it is immaterial to the operation of the prism whether it be retained in triangular form, as shown by the dotted lines, or be truncated as shown by the solid lines. However, the area shown in the dotted outline is substantially inoperative for any purpose and may be eliminated. It is also desirable that upper surface 32 of the prism be treated in the same manner as the outer surface of layer 12 with a suitable coating to absorb stray light.

Variation of the angular aperture of the prism with angle 30 may be readily computed. For example, if angle 30 is equal to 60° the angular aperture of the prism for total internal reflection will be approximately 52½°, and the limiting ray for light whose angle of incidence on entrance face 18 is greater than ray 22 will be the ray refracted within the prism parallel to prism face 14. In this case the greater proportion of the field will be for light incident on entrance face 18 at angles smaller than ray 22. It will accordingly be seen that angle 30 may be readily chosen for a value between 60 and 90° such that the field of the prism will comprise equal parts on each side of ray 22.

The advantages of the above-described prism should be readily apparent. Its angular aperture is substantially larger than that of any polarizing prism previously known in the art. Another novel advantage is that the polarized ray does not traverse any birefringent material, and this in turn makes it possible by a suitable choice of prism material to extend the polarized wavelength band substantially into the ultraviolet and infrared positions of the spectrum. Its reversing feature also makes it particularly adaptable for use as one half of a Porro prism system in a telescope or similar device wherein it is desired both to erect and to polarize a real image.

The polarizing prism shown in Fig. 1 may be modified in many ways without departing from the scope of the invention. It has already been pointed out that the invention is not limited to any particular shape nor to any particular apex angle or angles. Neither is it essential that the entrance and exit faces of the prism be of equal length. It should be noted, however, that in embodiments of the invention, such as that shown in Fig. 1, wherein much of the light reaches the exit or entrance face of the prism at oblique incidence, it may be desirable to provide said faces with a coating adapted to reduce surface reflection. Such a coating may comprise a layer of any suitable transparent material having a refractive index substantially lower than that of the material composing the body of the prism and having a thickness substantially equal to a quarter-wavelength of visible light. If, for example, prism 10 comprises glass, said coating may comprise magnesium fluoride, which has a refractive index of approximately 1.37, and many other suitable materials will be readily apparent to those skilled in the art.

The body of prism 10 may be formed of many hard, optically isotropic, transparent materials, including glass or any suitable organic plastic. For many purposes also it is preferred to form prism 10 of a material having a stress optical coefficient as nearly as possible equal to zero. Otherwise the heat absorbed by the prism from the light passing therethrough may set up birefringent stresses in the prism, which will in turn impart an undesired ellipticity of vibration to the polarized light transmitted thereby. One example of a suitable such material is a lead glass fused from a batch comprising approximately 75% PbO by weight. A plastic of similar properties may be made by copolymerizing a plurality of organic resins of opposite signs of birefringence in such proportions that the resulting materials has the desired zero stress optical coefficient. For example, such a copolymer may comprise approximately 80% by weight of methyl methacrylate and approximately 20% of allyl methacrylate or methacrylic anhydride.

The adhesive used in layer 15 in Fig. 1 may also be varied at will, but it will be apparent that the polarizing efficiency of the prism depends in part upon how closely the refractive index of the adhesive matches that of the glass and the matching index of birefringent layer 12. For optimum results all three indices should match over as long a wavelength band as possible, since for any wavelength for which the indices do not match there will be partial reflection of the undesired, ordinary ray. The same factors also affect the choice of birefringent material for layer 12, and for the same reason.

Sodium nitrate has been mentioned as a material suitable for use in birefringent layer 12 primarily because of the relatively large difference between its indices, but the invention is not limited thereto nor to the use of a section of birefringent material perpendicular to an optic axis. Any random section of any birefringent material may be used, but in such cases the azimuth therefor will preferably be so chosen as to give maximum separation between the ordinary and extraordinary rays for light incident on the interface from the entrance face of the prism. It has recently been discovered that highly birefringent films having essentially the optical properties of a basal section of a uniaxial crystal can be produced by the evaporation and deposition in a vacuum of certain organic compounds. Such films are well adapted for use in the practice of the present invention, particularly because they will adhere firmly to glass without the necessity of a separate adhesive layer. In one embodiment of the invention, therefore, layer 12 may be understood as comprising a film of, for example, isophthalic acid, terephthalic acid, or a mixture of both formed on prism face 14 by evaporation and deposition in a vacuum. Said film need be only sufficiently thick to avoid interference effects and a few wavelengths, for example five wavelengths, will be ample. It should be noted that it is not even essential in the embodiment of the invention shown in Fig. 1 that birefringent layer 12 be transparent. All such variations are to be understood as coming within the scope of the invention.

Fig. 2 shows a further embodiment of the invention wherein the inactive sides of prism 40 are parallelograms and wherein layer 42 is birefringent and corresponds in material and function to layer 12 in Fig. 1. Layer 42 is understood to be in optical contact with prism face 44. The operation of the device is illustrated by the ray diagrams in Fig. 2, wherein dotted lines 45 represent light normally incident on entrance face 46. At the interface with birefringent layer 42, each of rays 45 is resolved into an ordinary ray 48 and an extraordinary ray 50. The angle between prism faces 44 and 46 is so chosen that extraordinary rays 50 are totally internally reflected, and they then impinge on prism face 52, where they are again totally internally reflected and emerge from exit face 54 travelling parallel to their original course but shifted sidewise with respect thereto. Ordinary rays 48 may be absorbed by a suitable coating 55 on the outer surface of birefringent layer 42 in the same manner as ordinary rays 24 in Fig. 1. It is also desirable to provide prism face 52 with a suitable coating, preferably light-reflecting, for the purpose of minimizing stray light. This device is particularly useful in a variety of instruments wherein it is desirable to shift the path of a light beam and to polarize said beam without inverting or reversing the image carried thereby. The operation of the device shown in Fig. 2 is otherwise subject to all the factors and variations discussed in connection with Fig. 1.

Since certain modifications in the product which embody the invention may be made without departing from its scope, it is intended that all matter contained in the above description, or shown in the accompanying drawing shall be interpreted as illustrative and not in a limiting sense.

What is claimed is:

1. A light-polarizing device comprising, in combination, a prism comprising transparent, optically isotropic material, said prism having an entrance face and an exit face, each of said faces making with a third face an angle less than 90°, and a layer of birefringent material in optical contact with said third face of said prism, said layer having the optical properties of a basal section of a uniaxial crystal, the refractive index of said prism and the higher refractive index of said birefringent layer being substantially equal, said entrance and exit faces making with each other an angle greater than 60°, the three said faces of said prism being so disposed with respect to each other that light propagated in a direction substantially parallel to said third face and entering said prism through said entrance face will be directed against the interface between said third face and said birefringent layer at angles of incidence greater than the critical angle for the light component for which the refractive indices of said prism and said birefringent layer do not match and means providing a light-absorbing coating on the outer surface of said birefringent layer.

2. A light-polarizing device comprising, in combination, a prism comprising transparent, optically isotropic material, said prism having an entrance face and an exit face, a layer of birefringent material comprising a basal section of a sodium nitrate crystal mounted on a third face of said prism, a layer of transparent adhesive material bonding said crystal in optical contact with said prism face, the refractive indices of said prism and said adhesive and the higher refractive index of said crystal being substantially equal, said entrance and exit faces of said prism being adjacent said prism face and each forming therewith equal angles of less than 90°, said angles being such that light propagated in a direction substanially parallel to said third face and entering said prism through said entrance face will be directed against said third face of said crystal at angles of incidence greater than the critical angle for the light component for which the refractive indices of said prism and said crystal do not match and a coating comprising light-absorbing material on the outer surface of said crystal and having a refractive index substantially matching the higher refractive index of said crystal.

3. A light-polarizing device comprising, in combination, a truncated, right isosceles prism composed of transparent, optically isotropic glass having a refractive index substantially equal to the higher refractive index of sodium nitrate crystal, said prism having an entrance face, an exit face, and a base between said faces, a thin layer of a basal section of a sodium nitrate crystal overlying and secured in optical contact to said prism base, and a coating of light-absorbing material on the outer surface of said crystal section.

CUTLER D. WEST.

REFERENCES CITED

The following references are of record in the file of this patent:

UNITED STATES PATENTS

| Number | Name | Date |
|---|---|---|
| 1,963,127 | Gardner | June 19, 1934 |
| 2,241,041 | Sauer | May 6, 1941 |
| 2,246,817 | Sauer | June 24, 1941 |
| 2,274,100 | Ward, Jr. | Feb. 24, 1942 |
| 2,315,783 | Gilmore | Apr. 6, 1943 |

FOREIGN PATENTS

| Number | Country | Date |
|---|---|---|
| 398,100 | Great Britain | Sept. 7, 1933 |

OTHER REFERENCES

Johannsen Text Manual of Petrographic Methods, 1918, McGraw Hill Bk. Co., 239 West 39th St., N. Y., pages 164, 168, 169 and 170.